US011987309B2

(12) United States Patent
Tanaka et al.

(10) Patent No.: US 11,987,309 B2
(45) Date of Patent: May 21, 2024

(54) STEERING WHEEL DEVICE FOR VEHICLE

(71) Applicant: Autoliv Development AB, Vargarda (SE)

(72) Inventors: Kaname Tanaka, Kanagawa (JP); Keisuke Honma, Kanagawa (JP); Kazuhiro Abe, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/042,716

(22) PCT Filed: Jul. 28, 2021

(86) PCT No.: PCT/JP2021/027859
§ 371 (c)(1),
(2) Date: Feb. 23, 2023

(87) PCT Pub. No.: WO2022/044668
PCT Pub. Date: Mar. 3, 2022

(65) Prior Publication Data

US 2023/0331297 A1 Oct. 19, 2023

(30) Foreign Application Priority Data

Aug. 28, 2020 (JP) ................................ 2020-144815

(51) Int. Cl.
*B62D 7/22* (2006.01)
*B60R 21/203* (2006.01)
(Continued)

(52) U.S. Cl.
CPC ............ *B62D 7/222* (2013.01); *B60R 21/203* (2013.01); *B62D 1/04* (2013.01); *F16F 15/073* (2013.01)

(58) Field of Classification Search
CPC .......... B60R 21/203; B62D 7/222; B62D 1/04
See application file for complete search history.

(56) References Cited

U.S. PATENT DOCUMENTS 8,459,686 B2 * 6/2013 Suzuki ................ B60R 21/2037 200/61.54
9,550,525 B2 * 1/2017 Ishii .................. B60R 21/21658
(Continued)

FOREIGN PATENT DOCUMENTS

CN 114750720 A * 7/2022 ............... B62D 1/10
DE 102016106280 A1 10/2017
(Continued)

*Primary Examiner* — Faye M Fleming
(74) *Attorney, Agent, or Firm* — Foley & Lardner LLP

(57) ABSTRACT

A steering wheel device for a vehicle in which an airbag module is attached with an engagement element that engages with the steering wheel, where the engagement element is provided on the airbag module side and has an engaging part that releasably engages with an engaged part formed on the steering wheel side, the engagement elements include at least a first engagement element positioned below the center of steering and a second engagement element positioned above the center of steering with reference to the neutral position of the steering wheel, and the first engagement element is a vibration damping part having an elastic member and the second engagement element includes a second bushing made of a material having a Young's modulus greater than that of the elastic member.

10 Claims, 11 Drawing Sheets

(51) Int. Cl.
*B62D 1/04* (2006.01)
*F16F 15/073* (2006.01)

(56) References Cited

U.S. PATENT DOCUMENTS

| | | | | | |
|---|---|---|---|---|---|
| 10,913,420 | B2 * | 2/2021 | Ishii | B60R 21/2037 | |
| 11,351,915 | B2 * | 6/2022 | Matsuo | B60Q 5/003 | |
| 11,529,921 | B2 * | 12/2022 | Hirota | B60R 21/2037 | |
| 2014/0131982 | A1 * | 5/2014 | Ishii | B60R 21/2037 | 280/728.2 |
| 2015/0042079 | A1 * | 2/2015 | Ishii | B60R 21/21658 | 280/728.2 |
| 2018/0029556 | A1 * | 2/2018 | Ishii | B60R 21/2037 | |
| 2023/0174152 | A1 * | 6/2023 | Ishida | B60R 21/2037 | 280/731 |

FOREIGN PATENT DOCUMENTS

| | | | | |
|---|---|---|---|---|
| DE | 102018127636 | A1 * | 5/2020 | B60R 21/203 |
| JP | 2010-069934 | A | 4/2010 | |
| JP | 2015-096375 | A | 5/2015 | |
| JP | 2017-052433 | A | 3/2017 | |
| JP | 2017-197185 | A | 11/2017 | |
| JP | 2018-024410 | A | 2/2018 | |
| WO | 2019/142655 | A1 | 7/2019 | |
| WO | WO-2019142654 | A1 * | 7/2019 | B60R 21/203 |
| WO | 2020/003777 | A1 | 1/2020 | |
| WO | 2020/162315 | A1 | 8/2020 | |

* cited by examiner

[FIG. 1]
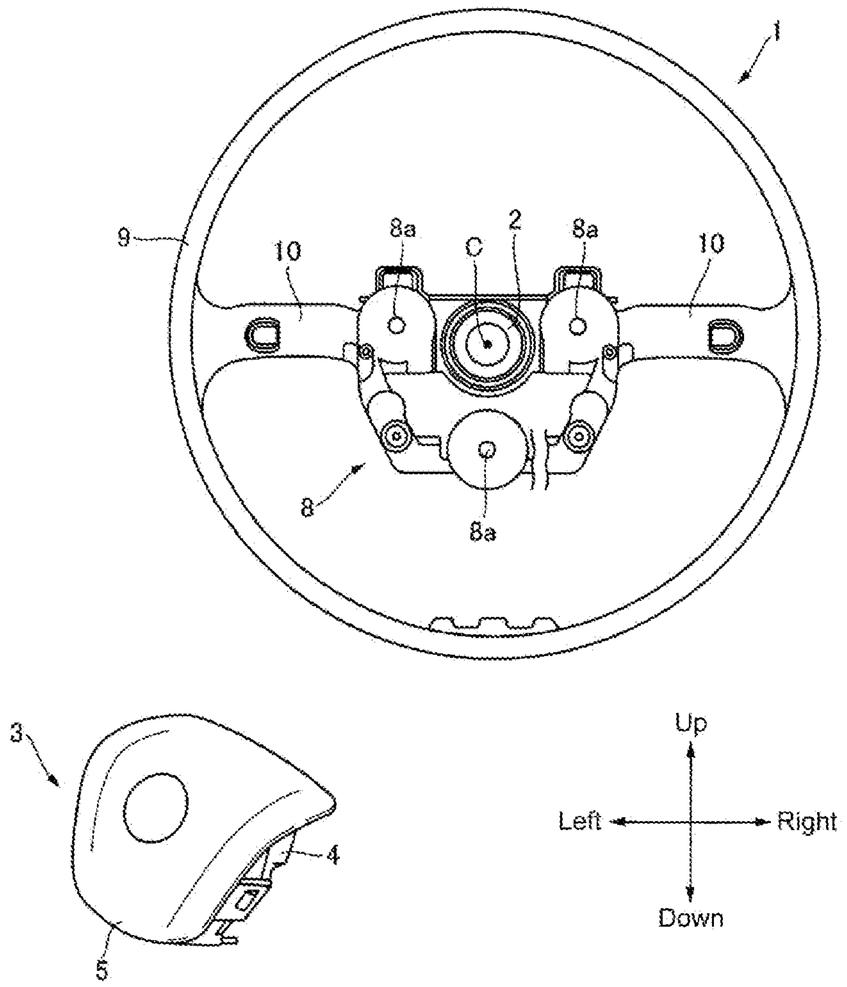

[FIG. 2]
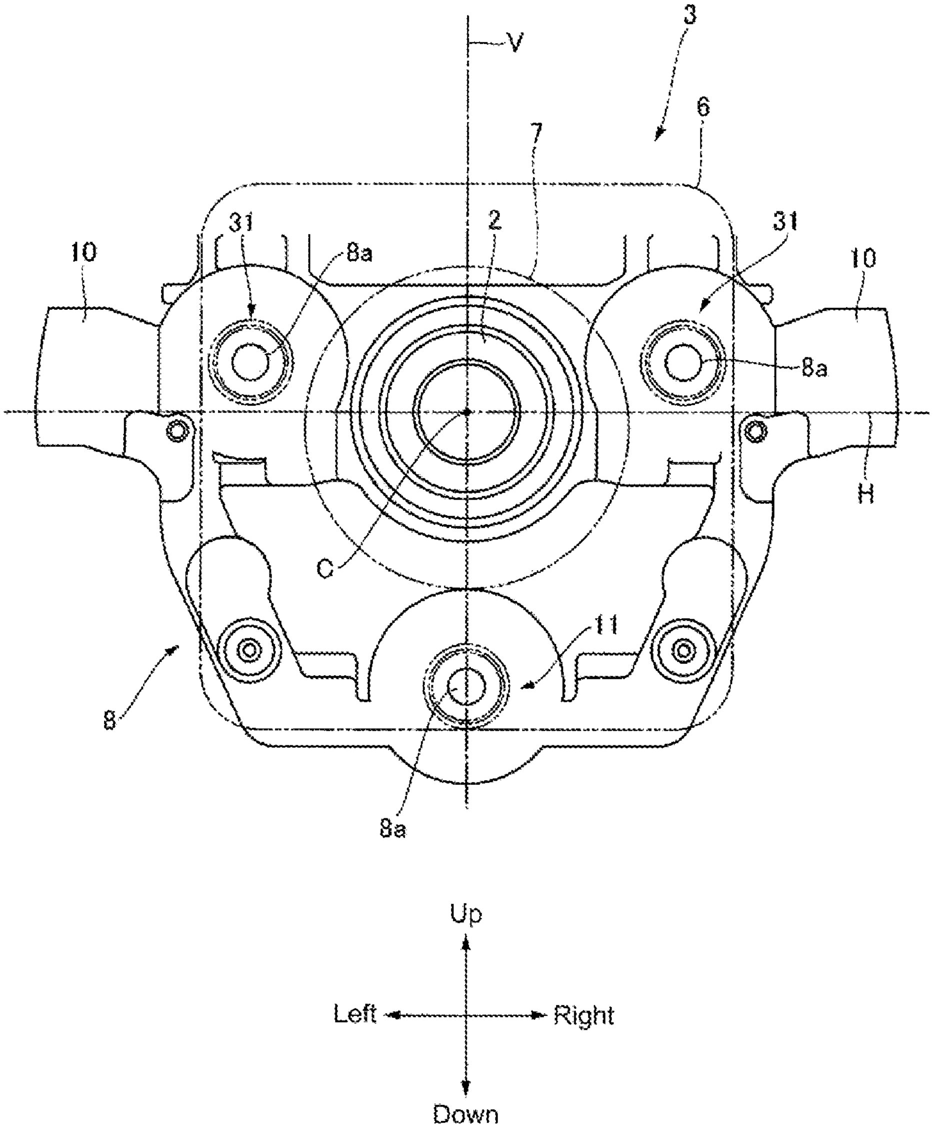

[FIG. 3]
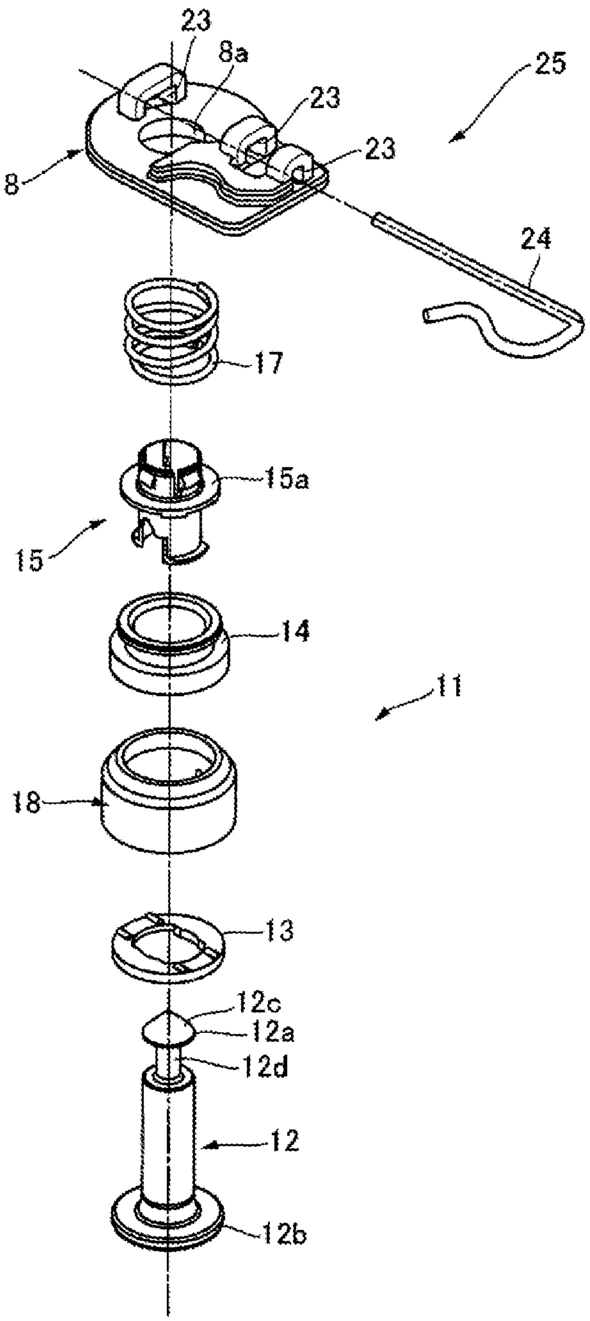

[FIG. 4]
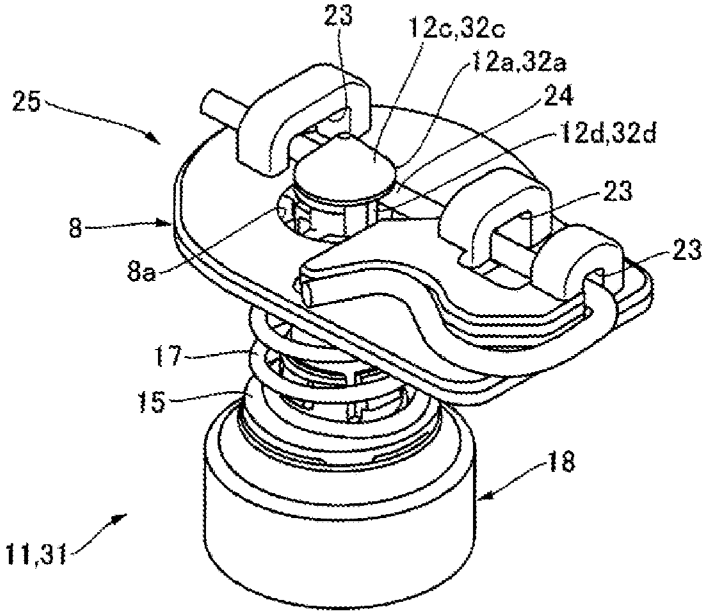
[FIG. 5]
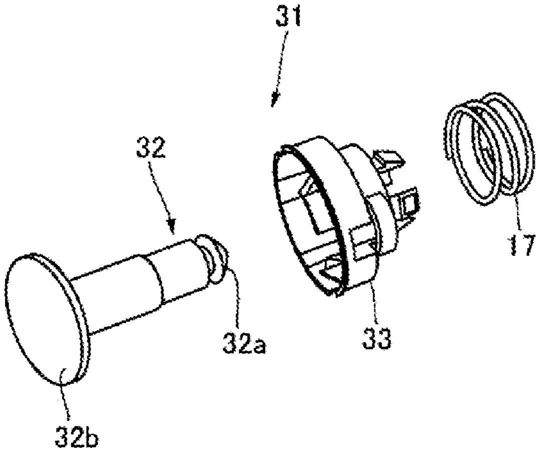

[FIG. 8]
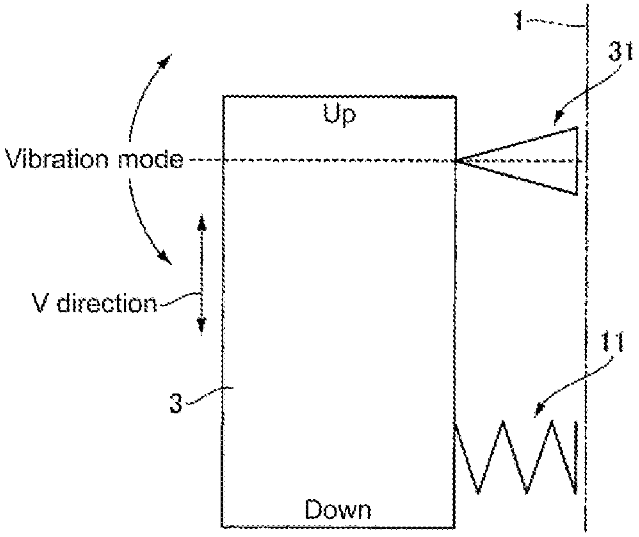
[FIG. 9]
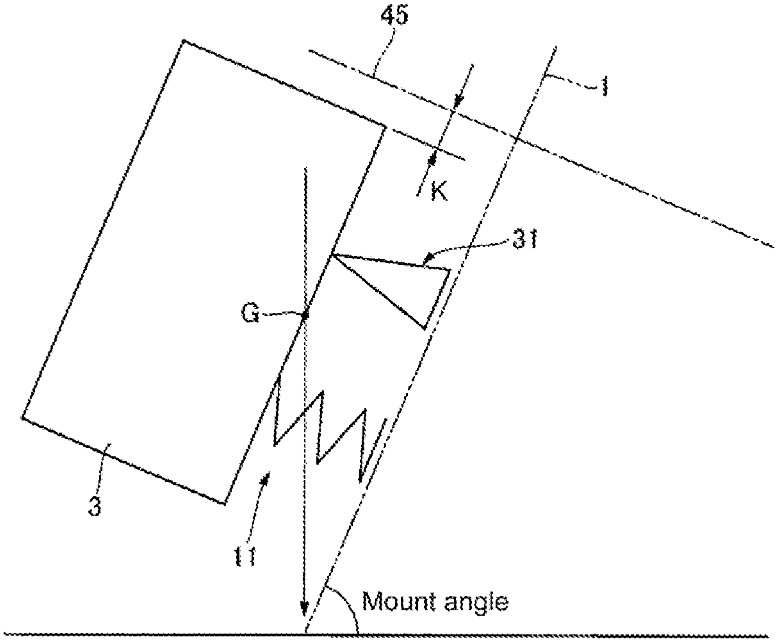

| | Arrangement of engagement elements relative to the steering wheel | | | Step change amount (SAG) |
|---|---|---|---|---|
| | Right | Down | Left | |
| All vibration damping parts | First engagement element 11 | ← | ← | 0.60 mm |
| Present Embodiment | Second engagement element 31 | First engagement element 11 | Second engagement element 31 | 0.25 mm |

[FIG. 13]
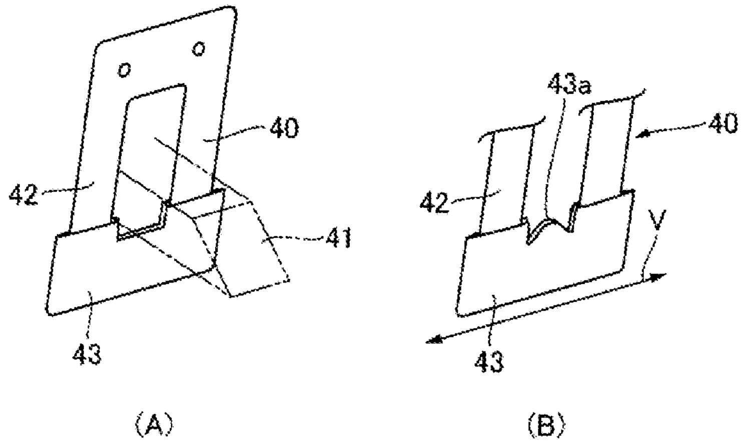

STEERING WHEEL DEVICE FOR VEHICLE

TECHNICAL FIELD

The present invention relates to a steering wheel device for a vehicle which is capable of effectively damping low-frequency vibrations generated in the steering wheel and has a simple structure.

CONVENTIONAL TECHNOLOGY

Patent document 1 discloses a steering wheel device for a vehicle in which an airbag module is attached by being engaged with a steering wheel via an engaging mechanism arranged around the steering wheel center of steering.

In the "steering wheel" of Patent Document 1, a pin holder (slider) is arranged outside a snap pin (support member) so as to be slidable in the front-to-back direction, and is biased backward by a coil spring (biasing member). The contact holder (cap member) covers the snap pin and the pin holder from the rear while being separated rearward from the rear end of the pin holder. A contact terminal (movable side contact portion) and a damper holder covering a part of the pin holder are mounted in the contact holder. An elastic member is interposed between the pin holder and the damper holder. A transmitting part is provided on the inner peripheral portion of the damper holder, and a transmitted portion (receiving portion) is provided on the outer peripheral portion of the pin holder in front of the transmitting portion to which the forward movement of the damper holder is transmitted through the transmitting portion.

In Patent Document 1, an elastic member that constitutes a dynamic damper is provided. In Patent Document 1, three horn switch mechanisms for attaching the airbag module to the steering wheel are arranged around the center of steering of the steering wheel.

RELATED ART DOCUMENTS

Patent Documents

Patent Document 1: Japanese Unexamined Patent Application 2017-197185

SUMMARY OF THE INVENTION

Problem to be Solved by the Invention

The vibration modes generated in the steering wheel include (1) vertical vibration caused by the engine in the low-frequency band of 30 to 50 Hz and (2) deformation resonance of the steering wheel in the high frequency band of 70 to 90 Hz.

The vibration mode in low-frequency bands can be damped considerably by a dynamic damper as disclosed in Patent Document 1.

However, since the dynamic dampers that are arranged at three locations are composed of at least three parts, being the elastic member, the pin holder, and the damper holder, there is a problem that the structure is complicated and the cost is high.

In light of the conventional issues described above, an object of the present invention is to provide a steering wheel device for a vehicle that is capable of effectively suppressing low-frequency vibrations generated in the steering wheel and that has a simple structure.

Means to Solve the Problem

The steering wheel device for a vehicle according to the present invention is a steering wheel device for a vehicle, in which an airbag module is attached to an engagement element that is arranged around a steering wheel center of steering and is engaged with said steering wheel, where:

- the engagement element is provided on the airbag module side and has an engaging part that detachably engages with the engaged part formed on the steering wheel side;
- the engagement element includes at least a first engagement element positioned below the center of steering and a second engagement element positioned above the center of steering with respect to the neutral position of the steering wheel;
- the first engagement element is a vibration damping part that is attached to the airbag module and retains a first pin having the engaging part, an elastic member for damping vibration of the steering wheel using the airbag module as a damper mass, and the elastic member, and includes a first bushing in slidable contact with the first pin; and
- the second engagement element is attached to the airbag module, is formed of a second pin having the engaging part, and is made of a material having a Young's modulus greater than that of the elastic member, and includes a second bushing in slidable contact with the second pin.

A gap between the second pin and second bushing of the second engagement element is desirable. A gap between the first pin and first bushing of the first engagement element is desirable. The gap is preferably in the range of 0.05 mm or more and 0.3 mm or less.

Instead of including the second pin and the second bushing, the second engagement element is desirably a leaf spring member with a first end joined to the airbag module and a second end provided with the engaging part that engages with the engaged part. It is preferable that the engaging part is provided with an insulator.

The second elastic member is preferably provided between the steering wheel and the airbag module to elastically support the airbag module on the steering wheel. Preferably, the second elastic member is a coil spring.

The first engagement element is preferably arranged on a vertical axis passing through the center of steering with reference to the neutral position of the steering wheel, and the second engagement elements are preferably arranged in a region between the vertical axis passing through the center of steering and a horizontal axis orthogonal to the vertical axis, and at symmetrical positions with respect to the vertical axis.

Effect of the Invention

The steering wheel device for a vehicle according to the present invention has a simple structure, and can effectively damp low-frequency vibrations in the steering wheel.

BRIEF DESCRIPTION OF THE DRAWINGS

FIG. 1 is an explanatory diagram illustrating a preferred Embodiment of a steering wheel device for a vehicle according to the present invention, of a steering wheel to which an airbag module is attached, covered with a horn cover.

FIG. 2 is an enlarged view of the main parts of the steering wheel as illustrated in FIG. 1.

FIG. 3 is an exploded perspective view of a first engagement element of the steering wheel device for a vehicle as illustrated in FIG. 1.

FIG. 4 is a perspective view illustrating an engaged state of the first engagement element illustrated in FIG. 3.

FIG. 5 is an exploded perspective view of the second engagement element of the steering wheel device for a vehicle illustrated in FIG. 1.

FIG. 8 is an explanatory diagram explaining the vibration mitigation effect of the steering wheel device of the vehicle as illustrated in FIG. 1.

FIG. 9 is an explanatory diagram explaining the step change amount of the steering wheel device for a vehicle as illustrated in FIG. 1.

FIG. 10 is a diagram of a table comparing step change amounts between the steering wheel device for a vehicle as illustrated in FIG. 1, and a case where all parts are vibration damping parts.

FIG. 13 is an explanatory diagram explaining the second engagement element of the Modified Example as illustrated in FIG. 11, where (A) is an overall perspective view and (B) is a perspective view of the main parts when the insulator is provided with a raised section.

DESCRIPTION OF THE PREFERRED EMBODIMENTS

Figure 6:
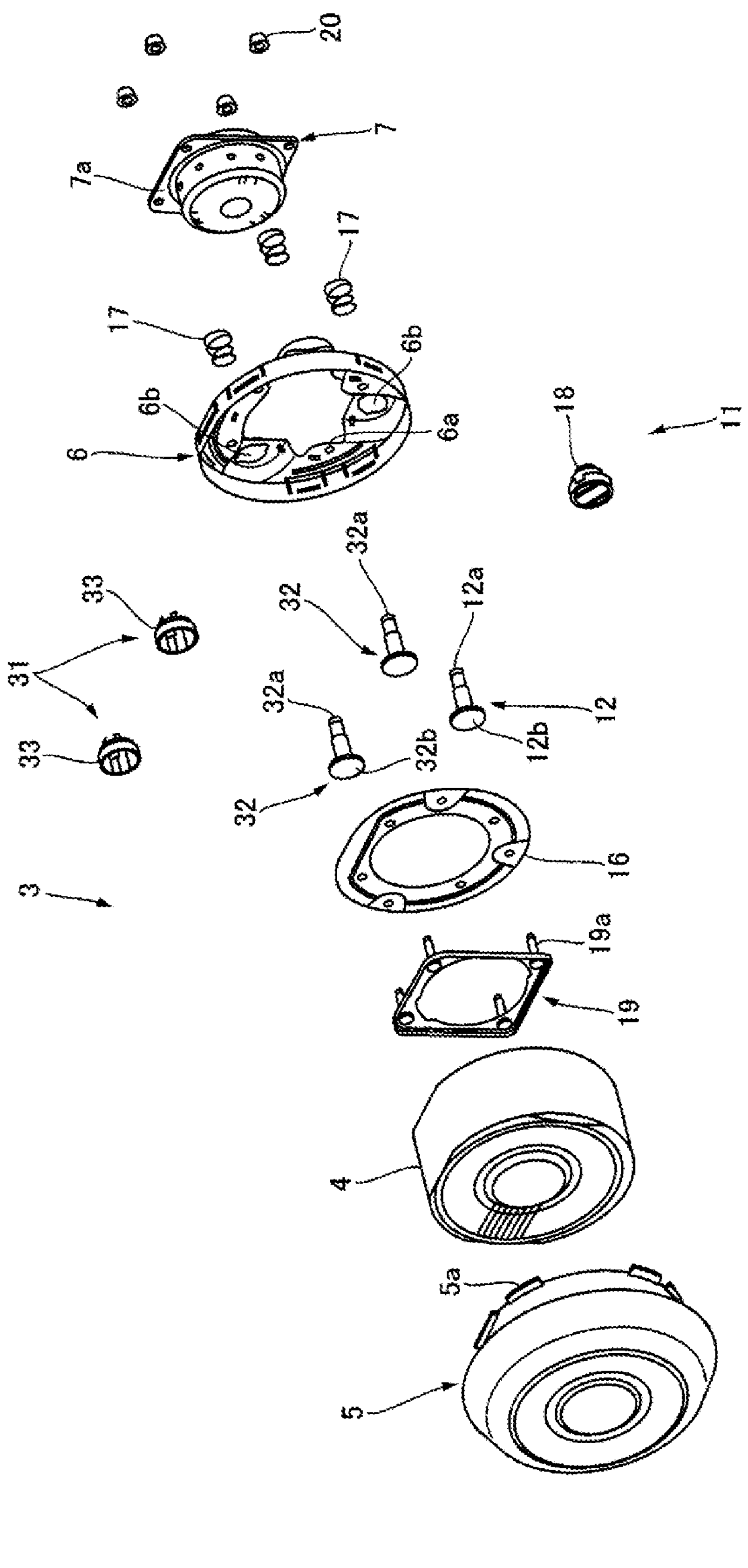
FIG. 6 is an exploded perspective view explaining the attachment of the first and second engagement elements to the airbag module of the steering wheel device for a vehicle illustrated in FIG. 1.

A suitable Embodiment of the vehicle steering wheel device according to the present invention will be described in detail below with reference to the accompanying drawings.

FIG. 1 is an explanatory diagram of a steering wheel device for a vehicle according to the Present Embodiment, illustrating a steering wheel to which an airbag module is attached, covered with a horn cover. FIG. 2 is an enlarged view of the main parts of the steering wheel as illustrated in FIG. 1.

In these drawings, up, down, left, and right directions are indicated on the steering wheel with respect to the neutral position at a zero steering angle. Otherwise, the side viewed from the driver's side shall be described as the front side and the opposite side as the back side.

The steering wheel 1 is installed in the driver seat of a vehicle. The boss portion 2 of the steering wheel 1 is connected to a steering shaft passing through the interior of a steering column (not shown). The steering shaft transmits the operating force of the driver to the steering gear and the like.

An airbag module 3 that functions as a front airbag in an emergency is mounted in the center of the steering wheel 1.

The airbag module 3 also functions as a horn switch under normal operation that a driver pushes to cause the horn to sound.

As illustrated in FIG. 1, the driver side of the airbag module 3 is covered with a resin horn cover 5 that functions as a design surface. An airbag cushion 4 is provided on the back side of the horn cover 5.

The airbag module 3 includes a metal housing 6 with an airbag cushion 4 and an inflator 7, which will be described in detail later. The airbag cushion 4 is provided in a folded state. The inflator 7 supplies inflator gas to the airbag cushion 4.

When a signal is sent from a vehicle sensor in an emergency, inflation gas is supplied from the inflator 7 to the airbag cushion 4. The airbag cushion 4 to which the inflation gas is supplied cleaves the horn cover 5 and expands and deploys into the vehicle interior space. The expanded and deployed airbag cushion 4 restrains and protects the driver.

In general, the steering wheel 1 includes a central cored bar 8, a circular rim part 9, and spokes 10 connecting the central cored bar 8 and the rim part 9. The boss part 2 is formed in the central cored bar 8. The rim part 9 is grasped by the driver.

In the steering wheel device for a vehicle according to the present Embodiment, the airbag module 3 is attached to the steering wheel 1 by the first engagement element 11 and the second engagement element 31 that are engaged with the steering wheel 1. The first engagement element 11 and second engagement element 31 are arranged around the center of steering C of the steering wheel 1.

Of the steering wheel 1 and airbag module 3, these engagement elements 11 and 31 are provided on the airbag module 3 side. The engagement elements 11 and 31 have engaging parts **12*a* and 32*a* that detachably engage with the engaged parts 25 formed on the steering wheel 1 side. Specifically, the engaged part 25 is the structural portion provided in the central cored bar 8 of the steering wheel 1, with the set spring 24 in the insertion hole 8*a* (see FIG. 4**).

As illustrated in FIG. 2, the first engagement element 11 is positioned lower than the center of steering C with respect to the neutral position C of the steering wheel 1 at zero steering angle. The second engagement element 31 is positioned above the center of steering C with respect to the same neutral position C.

The engagement elements 11 and 31 are provided on the airbag module 3 side and are engaged with the steering wheel 1. Of these engagement elements 11 and 31, at least one of the first engagement elements 11 functions as a vibration damping part to dampen the vibration of the steering wheel 1. The airbag module 3 serves as a damper mass for vibration damping.

In other words, the first engagement element 11 is arranged between the steering wheel 1 and the airbag module 3 to dampen vibration transmitted from the steering shaft to the steering wheel 1.

The structures of the first and second engagement elements 11 and 31 will be described in detail with reference to FIG. 3 to FIG. 7.

The airbag module 3 serves as a damper mass of the first engagement element 11, which is a vibration damping part, on the steering wheel 1 side. The first and second engagement elements 11 and 31 are provided between the central cored bar 8 of the steering wheel 1 and the airbag module 3.

The first and second engagement elements 11 and 31 are arranged around the boss part 2 of the steering wheel 1. In the illustrated example, one first engagement element 11 and two second engagement elements 31 are provided. These engagement elements are spaced appropriately apart from each other.

More specifically, as illustrated in FIG. 2, one first engagement element 11 is arranged on the vertical axis V passing through the center of steering C with respect to the neutral position of the steering wheel 1 with zero steering angle and on the lower side of the boss part 2. The second engagement elements 31 are arranged one by one in a region between the vertical axis V passing through the center of steering C and the horizontal axis H orthogonal to the vertical axis V, with respect to the neutral position of the steering wheel 1 with zero steering angle, and at a position that is line-symmetrical with respect to the vertical axis V.

The second engagement elements 31 are arranged on both sides of the boss part 2 in the left-right direction (on the left and right spokes 10 sides).

The housing 6 is provided with an inflator 7 facing the central cored bar 8 of the steering wheel 1 on which the first and second engagement elements 11 and 31 are arranged.

First, the first engagement element 11 will be described. The first engagement element 11, as illustrated in FIG. 3 and FIG. 4 (only a portion of the central cored bar 8 is illustrated in the figures), includes a straight shaft-shaped first pin 12 having an engaging part 12*a* and a base plate part 12*b* at both ends, a holder plate 13 that surrounds the first pin 12 and overlaps with the base plate part 12*b*, a circular elastic member 14 that surrounds the first pin 12 and overlaps with the holder plate 13, a cylindrical insulator 15 having a spring sheet 15*a* superimposed on the elastic member 14 and provided so as to surround the first pin 12, and a first bushing 18 formed in a hollow cylindrical shape surrounding the elastic member 14, through which the first pin 12 is inserted, and which is provided overlapping with the base plate part 12*b*.

A holder plate 13, elastic member 14, and cylindrical insulator 15 are set inside the first bushing 18.

The inner periphery of the first bushing 18 is slidably brought into contact with the first pin 12 with a small gap D2 relative to the first pin 12 (see FIG. 7(B)). As a result, movements along the first pin 12 that occur between the steering wheel 1 side and the airbag module 3 side are smoothly guided.

A metal coil spring 17 that is the second elastic member, is provided between the spring sheet 15*a* and the central cored bar 8. The coil spring 17 encircles the first pin 12 and elastically supports the airbag module 3 relative to the steering wheel 1.

The elastic member 14 damps the vibration of the steering wheel 1 using the airbag module 3 as a damper mass.

The constituent parts of the first engagement element 11, except for the elastic member 14, are formed of synthetic resin molded parts.

The first pin 12 is provided on the hollow cylindrical first bushing 18 by inserting the engaging part 12*a* into the first bushing 18 and locking the base plate part 12*b* to the first bushing 18. The tip 12*c* of the engaging part 12*a* is cone-shaped.

The holder plate 13 is provided in the axial direction of the first pin 12 so as to be in close contact with the elastic member 14.

The holder plate 13 is superimposed between the base plate part 12*b* and the elastic member 14. The holder plate 13 allows the elastic member 14 to exhibit the set damping performance regardless of the mounting accuracy of the first bushing 18 and the first pin 12.

The first pin 12 of the first engagement element 11 is engaged with the central cored bar 8 of the steering wheel 1. The engaging part 12*a* of the first pin 12 is inserted through an insertion hole 8*a* that is formed through the central cored bar 8.

The engaging part 12*a* of the first pin 12 is formed with a narrow part 12*d* so as to reduce the diameter. The outer diameter of the narrow part 12*d* is smaller than the hole diameter of the insertion hole 8*a*.

A locking groove 23 is formed in the back surface of the central cored bar 8 on the side opposite the airbag module 3 side.

A rod-shaped set spring 24 is locked in the locking groove 23. The rod-shaped set spring 24 is supported by the central cored bar 8. In the illustration, an omega spring with a bent part that contacts the back side of the central cored bar 8 is used as the rod-shaped set spring 24. The omega spring prevents the spring from falling out of the locking groove 23.

The set spring 24 is elastically deformed and engaged with regards to the narrow part 12*d* of the engaging part 12*a* of the first pin 12, which is positioned across the insertion hole 8*a* and inserted into the insertion hole 8*a*. The engaging part 12*a*, or in other words the first engagement element 11, is thus attached to the central cored bar 8, or in other words to the steering wheel 1.

The actual assembly is performed by fitting the engaging part 12*a* of the first engagement element 11 attached to the airbag module 3 into the insertion hole 8*a* of the central cored bar 8.

The second engagement element 31 is described next. As illustrated in FIG. 5, the second engagement element 31 consists of a second pin 32 of the same configuration as the first pin 12 (see FIG. 4) and a second bushing 33. The second pin 32 has an engaging part 32*a*. The second bushing 33 is formed as a hollow cylinder, into which the second pin 32 is inserted, and is superimposed on the base plate part 32*b*.

Figure 7:
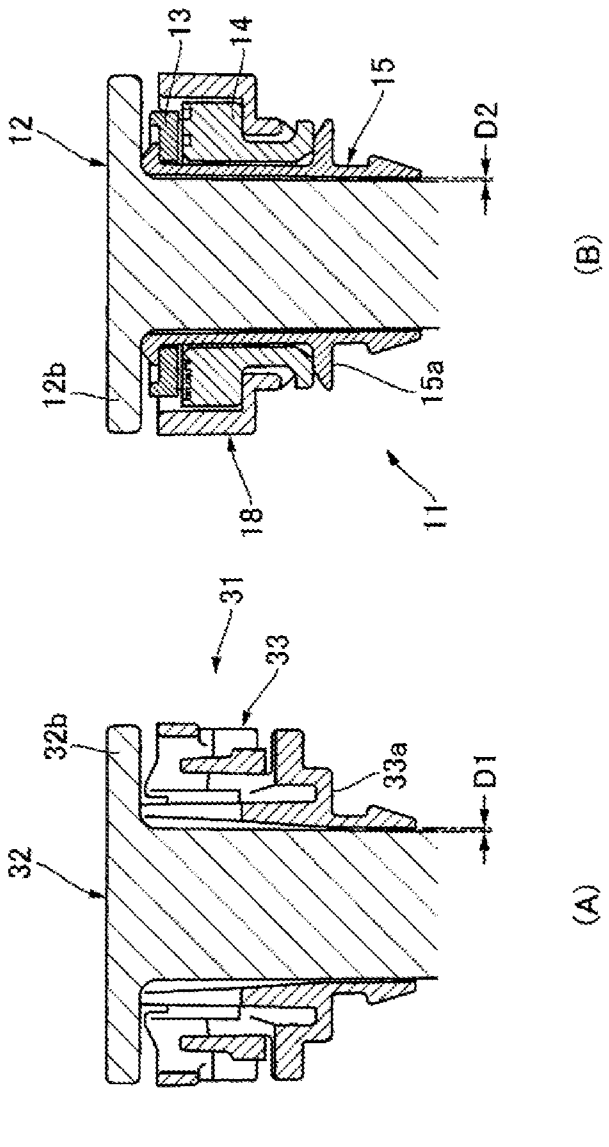
FIG. 7 is an explanatory diagram explaining the first and second engagement elements as illustrated in FIG. 3 and FIG. 5, where (A) is a cross-sectional view of the second engagement element and (B) is a cross-sectional view of the first engagement element.

The inner periphery of the second bushing 33 is slidably brought into contact with the second pin 32 with a small gap D1 relative to the second pin 32 (see FIG. 7 (A)). As a result, movements along the second pin 32 that occur between the steering wheel 1 side and the airbag module 3 side are smoothly guided.

The second bushing 33 is formed of a material with a larger Young's modulus (less elastic material) than the elastic member 14 of the first engagement element 11, which functions as a vibration damping part. The second bushing 33 is formed, for example, of a general-purpose resin such as PP or POM.

A metal coil spring 17, which is the second elastic member, is provided between the spring sheet 33*a* formed in the second bushing 33 and the central cored bar 8. The coil spring 17 encircles the second pin 32 and elastically supports the airbag module 3 against the steering wheel 1.

The second pin 32 is installed in the second bushing 33 by inserting the engaging part 32*a* into the hollow cylindrical second bushing 33 and engaging the base plate part 32*b* to the second bushing 33.

For the second pin 32 as well, the tip 32*c* of the engaging part 32*a* is formed into a cone shape, and formed with a narrow part 32*d*.

The engaging part 32*a* of the second engagement element 31 is engaged with the central cored bar 8 of the steering wheel 1 in the same manner as the engaging part 12*a* of the first engagement element 11.

Next, assembly of the engagement elements 11 and 31, which are engaged with the engaged part 25 of the steering wheel 1 as described above, to the airbag module 3 will be described with reference to FIG. 6.

The airbag module 3 includes:

- a metal housing 6 formed in a dish shape and having an inflator insertion hole 6*a* formed in the center,
- first and second bushings 18 and 33 that are provided on the first and second engagement elements 11 and 31,
- metal first and second pins 12 and 32 inserted from the housing 6 toward the central cored bar 8,
- an inflator 7 inserted from the central cored bar 8 to the inflator insertion hole 6*a,*
- an attachment plate 16 made of metal that is stowed inside the dish-shaped housing 6,
- a horn cover 5 made of resin such as synthetic resin for stowing the airbag cushion 4, and
- a retainer ring 19 made of metal having bolts 19*a* and superimposed on the attachment plate 16 from the horn cover 5 side.

Three through-holes 6*b* are formed in the housing 6 around the inflator insertion hole 6*a*, opposite the insertion hole 8*a.*

The first and second bushings 18 and 33 are attached to each through-hole 6*b* and are thereby retained in the housing 6 at said through-holes 6*b.*

The first and second pins 12 and 32 are slidable in the first and second bushings 18 and 33. The inflator 7 is provided with an outer flange 7*a* abutting the housing 6.

The attachment plate 16 is installed from the horn cover 5 side toward the housing 6 side, facing the first and second pins 12 and 32.

The attachment plate 16 clamps the base plate parts 12*b* and 32*b* of the first and second pins 12 and 32 between the housing 6 and the attachment plate 16.

The retainer ring 19 is fastened by a nut 20 and the bolt 19*a* that passes through attachment plate 16, housing 6, and outer flange 7*a* of the inflator 7.

This secures the inflator 7, and the like to the housing 6 with the first and second engagement elements 11 and 31 retained in the through-hole 6*b* of the housing 6.

The horn cover 5 is locked to the attachment plate 16 by a plurality of locking hooks 5*a* on the periphery of the opening.

The coil spring 17 is provided between the housing 6 on the airbag module 3 side and the central cored bar 8 on the steering wheel 1 side, and surrounds the first and second pins 12 and 32 that protrude from the through-hole 6*b* of the housing 6 toward the central core bar 8.

For the first and second engagement elements 11 and 31, the first and second bushings 18 and 33 are elastically attached by coil springs 17 from the central cored bar 8 relative to the first and second pins 12 and 32 with the base plate parts 12*b* and 32*b* kept between the attachment plate 16 and the housing 6. The first and second engagement elements 11 and 31 are then assembled to the airbag module 3.

The first and second engagement elements 11 and 31 attached to the airbag module 3 have the engaging parts 12*a* and 32*a* protruding from the airbag module 3 side toward the steering wheel 1 side.

The first and second pins 12 and 32 of the first and second engagement elements 11 and 31 are engaged by the elasticity of the coil spring 17, with the narrow parts 12*d* and 32*d* sliding freely relative to the set spring 24 in the insertion hole 8*a.*

When the horn cover 5 of the airbag module 3 is operated by pressing, the coil spring 17 contracts. This causes the airbag module 3 to approach the central cored bar 8, which conducts at the horn contacts (not shown) and causes the horn to sound.

When the pressure on the horn cover 5 is released, the coil spring 17 is extended and restored. This breaks the continuity of the horn contact and the horn stops sounding.

As illustrated in FIG. 7(A), a gap D1 is provided between the second pin 32 of the second engagement element 31 and the second bushing 33.

According to the analysis and study of the present invention, the gap D1 is preferably set within the range of 0.05 mm or more and 0.3 mm or less between the inner peripheral surface of the second bushing 32 and the outer peripheral surface of the second pin 32 over the entire inner peripheral surface of the second bushing 32.

Due to the gap D1 of the second engagement element 31, as illustrated in FIG. 8, the low-frequency vibration generated in the steering wheel 1 is diverted along the vertical axis V to the first engagement element 11 side, which enables setting a rolling vibration mode. This rolling vibration mode can be effectively damped by the first engagement element 11.

In addition, the movement along the second pin 32 that occurs between the steering wheel 1 side and the airbag module 3 side can be smoothly guided.

As illustrated in FIG. 7(B), a gap D2 is provided between the first pin 12 and first bushing 18 of the first engagement element 11. This gap D2 can smoothly guide the movement along the first pin 12 that occurs between the steering wheel 1 side and the airbag module 3 side.

The gap D2 is preferably set within the range of 0.05 mm or more and 0.3 mm or less between the inner peripheral surface of the first bushing 18 and the outer peripheral surface of the first pin 12 over the entire inner peripheral surface of the first bushing 18. This ensures smooth movement along the first pin 12 that occurs between the steering wheel 1 side and the airbag module 3 side.

In the steering wheel device of the vehicle of the present Embodiment, the airbag module 3 can be attached to the steering wheel 1 by engaging the engaging parts 12*a* and 32*a* of the first and second engagement elements 11 and 31 with the engaged part 25 provided in the central cored bar 8.

Vibrations of the steering wheel 1 can be damped by the first engagement element 11 prepared with the elastic member 14.

Of the engagement elements 11 and 31 that attach the airbag module 3 to the steering wheel 1 by engagement, the second engagement element 31 is not provided with an elastic member 14 and has a low cost configuration with fewer parts, thus simplifying the structure and reducing costs. On the other hand, low-frequency vibration mode vibrations that occur in the steering wheel 1 can be sufficiently and effectively damped by the first engagement element 11. According to the present Embodiment, both ensuring vibration damping and cost reduction can be achieved compared to using materials for everything equivalent to the first engagement element 11.

By providing a gap D1 between the second pin 32 of the second engagement element 1 and the second bushing 33, it is possible to create a vibration mode that can be damped by the first engagement element 11, and vibration of the steering wheel 1 can be effectively suppressed.

The second engagement element 31 can be composed of a metal second pin 32 and a second bushing 33, which has a simpler structure than the first engagement element 11, and the second bushing 33 can be molded from general-purpose resin, thus achieving cost reductions.

A telescopic coil spring 17, which is the second elastic member provided between the steering wheel 1 and the airbag module 3, can ensure horn operation.

FIG. 9 and FIG. 10 illustrate the differences that occur in mounting conditions of the airbag module 3 to the steering wheel 1 between the case where the first and second engagement elements 11 and 31 described in the above Embodiment are adopted and the case where all vibration damping parts are used.

When the airbag module 3 is attached to the steering wheel 1, the airbag module 3 is lowered by its own weight, as indicated by the arrows in FIG. 9 (G is the center of gravity in the figure).

In other words, when the airbag module 3 attached to the steering wheel 1 is changed from a horizontal state to a mounting angle for mounting, attachment of the airbag module 3 changes such that the gap K with respect to the garnish 45 around the steering wheel 1 increases.

The amount of change in this gap K is called step change amount (SAG) as illustrated in FIG. 10. A member that functions as a vibration damping part, such as the first engagement element 11, is composed of an assembly of several parts and includes an elastic member 14. Therefore, when all three are vibration damping parts, a step change amount of 0.60 mm, for example, occurred due to gaps between the parts and accumulation of bending deformation of the elastic member 14 when the angle of the airbag module 3 was changed from a horizontal state to the mounting angle.

In this configuration with two second engagement elements 31, the second engagement element 31 is simply the second pin 12 assembled to the second bushing 33. Unlike the first engagement element 11, there is no bending of the elastic member 14 in the second engagement element 31, thus allowing the step change amount to be kept small at 0.25 mm. As a result, the change in the size of the gap K with respect to the garnish 45 is reduced, and the design around the steering wheel 1 can be improved.

Figure 11:
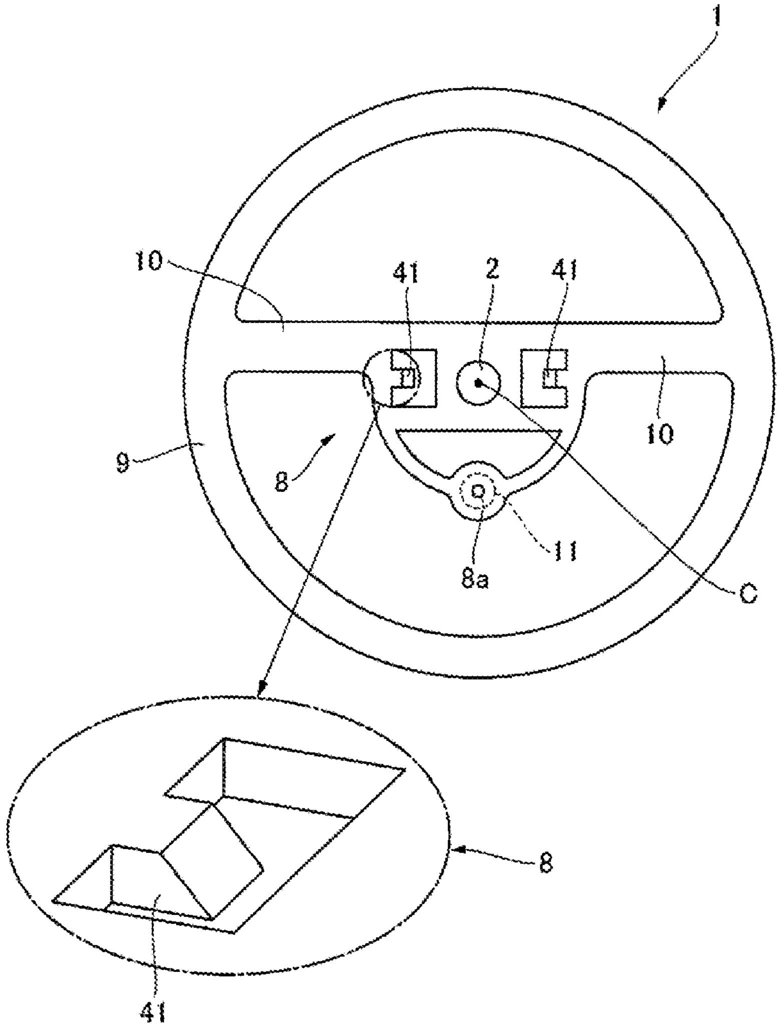
FIG. 11 is an explanatory diagram of a steering wheel in a Modified Example of a steering wheel device for a vehicle according to the present invention.
Figure 12:
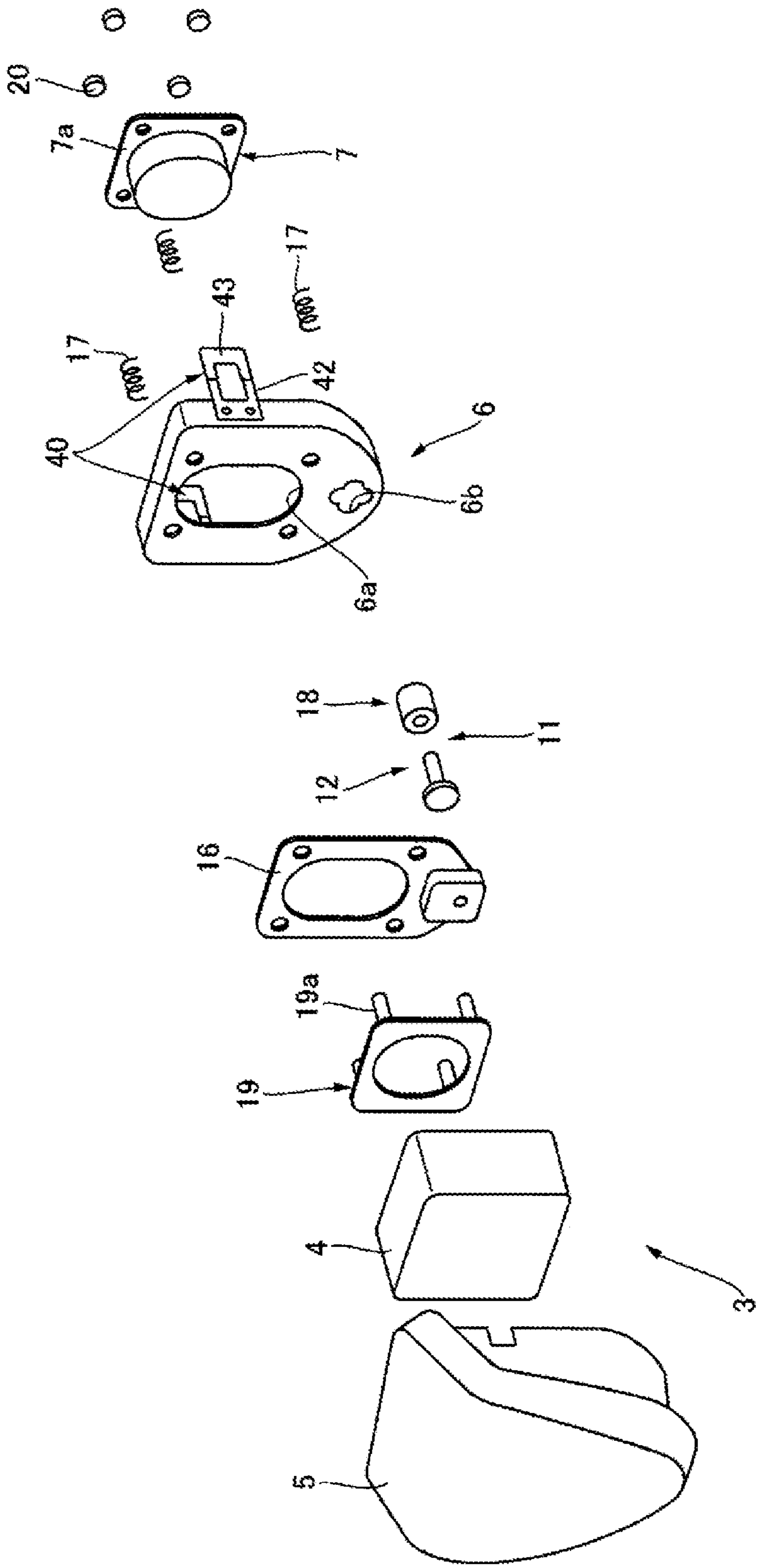
FIG. 12 is an exploded perspective view explaining the attachment of the first and second engagement elements to an airbag module of the Modified Example as illustrated in FIG. 11.

FIG. 11 to FIG. 13 illustrate Modified Examples of the above embodiment. In this Modified Example, instead of having the second pin 12 and the second bushing 33 as the second engagement element 31 described above, a metal leaf spring member 40 is used.

The leaf spring member 40 has an engaging part 42 with a first end in the length direction joined to the housing 6 of the airbag module 3 by a rivet or the like and a second end in the length direction thereof engaged to the engaged part 41. A synthetic resin insulator 43 is provided at the engaging part 42.

The leaf spring member 40 is provided so that the plate width direction is oriented in the vertical direction and the plate thickness direction is oriented in the horizontal direction.

The engaged part 41 of the central cored bar 8 is configured by a claw-shaped hook part instead of the configuration described above including the insertion hole 8*a* and the like.

The engaging part 42 of the leaf spring member 40 constitutes a hole into which the engaged part 41 is releasably inserted and engaged.

As illustrated in FIG. 13(A), the insulator 43 of the engaging part 42 guides the engagement by slidably contacting the engaged part 41 when engaged with the engaged part 41.

As illustrated in FIG. 13(B), if the insulator 43 forms a raised section 43*a* that undulates along the direction of the vertical axis V, the leaf spring member 40 can oscillate so that it rolls against the engaged part 41. This creates the rolling vibration mode described above toward the first engagement element 11 and effectively damps the vibration.

In this Modified Example, compared to the size of the second engagement element 31 with the hollow cylindrical second bushing 33 of the embodiment described above, the thickness in left and right direction can be roughly as thin as the thickness of the leaf spring member 40. Therefore, the dimension in the left-right direction required for the airbag module 3 can be reduced, and can be applied favorably to narrow-width designs.

In this Modified Example, the coil spring 17 is provided between the steering wheel 1 and the airbag module 3 in parallel with the leaf spring member 40.

The vehicle steering wheel device described above is a preferred example of the present invention, while other Embodiments can also be implemented or carried out by various methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

EXPLANATION OF CODES

1. Steering wheel
3. Airbag module
11. First engagement element
12. First pin
12*a*, 32*a*, 42. Engaging part
14. Elastic member
17. Coil spring
18. First bushing
25, 41. Engaged part
31. Second engagement element
32. Second pin
33. Second bushing
40. Leaf spring member
43. Insulator
C. Center of steering
D1. Gap between the second engagement element second pin and the second bushing
D2. Gap between the first engagement element first pin and the first bushing
H. Left-right direction axis
V. Up-down direction axis

The invention claimed is:

1. A steering wheel device for a vehicle, in which an airbag module is attached to an engagement element that is arranged around a steering wheel center of steering and is engaged with said steering wheel, wherein:

the engagement element is provided on the airbag module side and has an engaging part that detachably engages with the engaged part formed on the steering wheel side;

the engagement element includes at least a first engagement element positioned below the center of steering and a second engagement element positioned above the center of steering with respect to the neutral position of the steering wheel;

the first engagement element is a vibration damping part that is attached to the airbag module and retains a first pin having the engaging part, an elastic member for damping vibration of the steering wheel using the airbag module as a damper mass, and the elastic member, and includes a first bushing in slidable contact with the first pin; and the second engagement element is attached to the airbag module, is formed of a second pin having the engaging part, and is made of a material having a Young's modulus greater than that of the elastic member, and includes a second bushing in slidable contact with the second pin.

2. The steering wheel device for a vehicle according to claim 1, wherein a gap is provided between the second pin and second bushing of the second engagement element.

3. The steering wheel device for a vehicle according to claim 1, wherein a gap is provided between the first pin and first bushing of the first engagement element.

4. The steering wheel device for a vehicle according to claim 2, wherein the gap is in the range of 0.05 mm or more to 0.3 m or less.

5. A steering wheel device for a vehicle according to claim 1, wherein instead of including the second pin and the second bushing, the second engagement element is a leaf spring member with a first end joined to the airbag module and a second end provided with the engaging part that engages with the engaged part.

6. The steering wheel device for a vehicle according to claim 5, wherein the engaging part is provided with an insulator.

7. The steering wheel device for a vehicle according to claim 1, wherein a second elastic member is provided between the steering wheel and the airbag module to elastically support the airbag module on the steering wheel.

8. The steering wheel device for a vehicle according to claim 7, wherein the second elastic member is a coil spring.

9. The steering wheel device for a vehicle according to claim 1, wherein the first engagement element is arranged on a vertical axis passing through the center of steering with reference to the neutral position of the steering wheel, and the second engagement element is arranged in a region between the vertical axis passing through the center of steering and a horizontal axis orthogonal to the vertical axis, at a line-symmetrical position with respect to the vertical axis.

10. The steering wheel device for a vehicle according to claim 3, wherein the gap is in the range of 0.05 mm or more to 0.3 m or less.

* * * * *